July 2, 1957 W. COOKSON 2,797,777
RELEASABLE FASTENING MEANS FOR RESILIENT SHEET MATERIAL PARTS
Original Filed Aug. 26, 1952 3 Sheets-Sheet 1
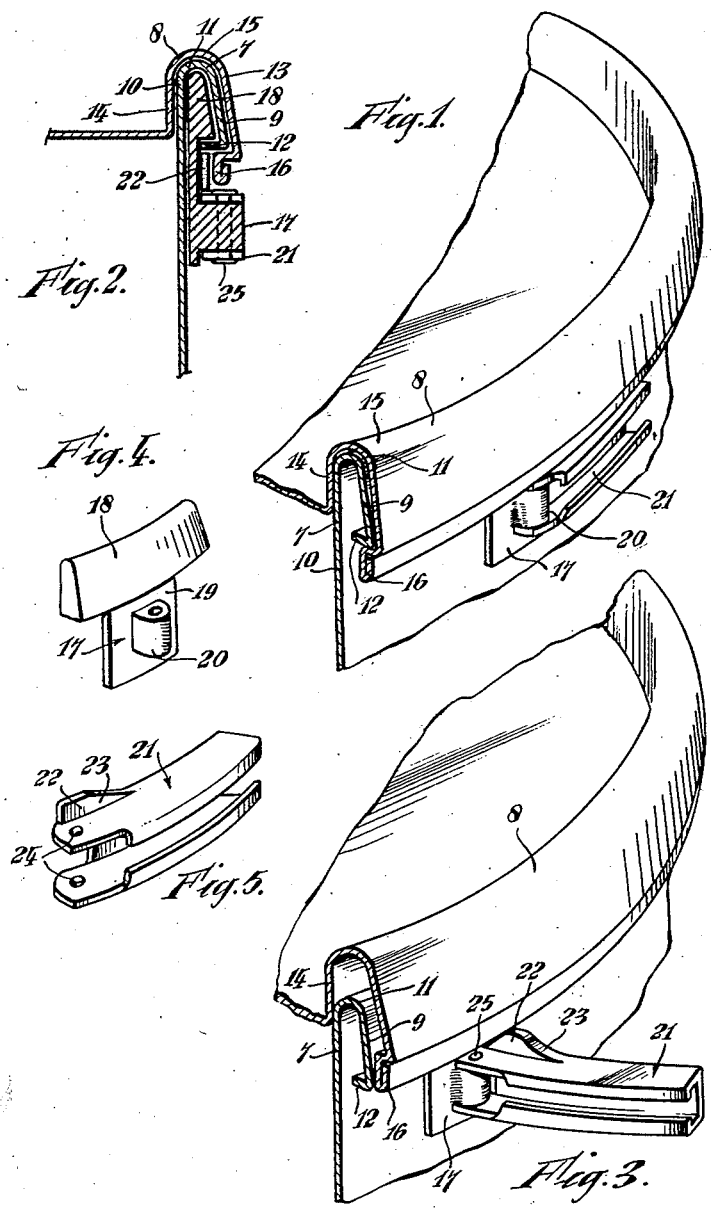
William Cookson
By Churchill, Rich, Weymouth & Engel
Attys.

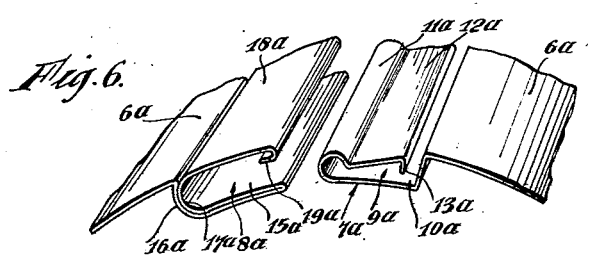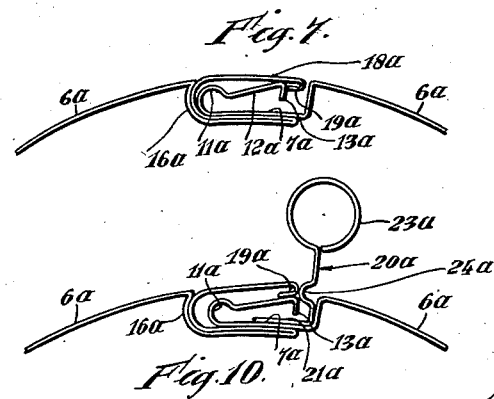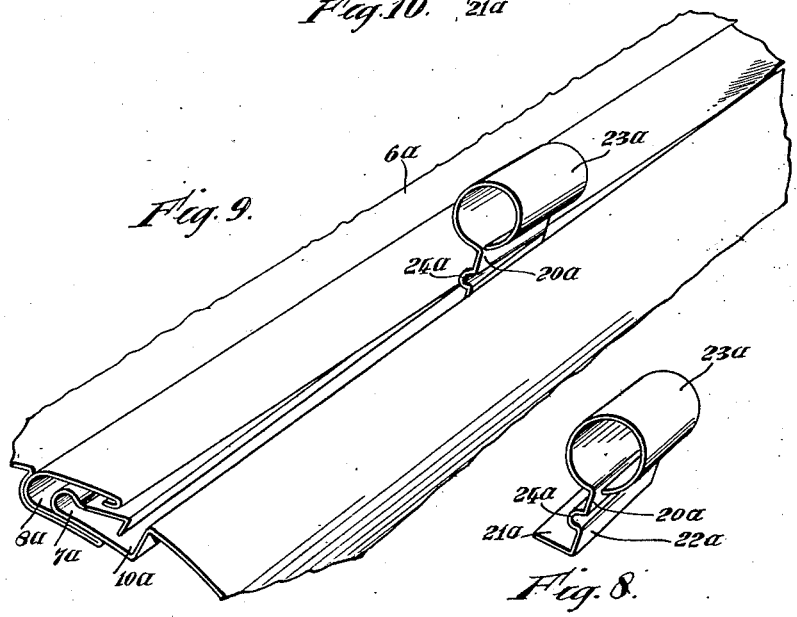

July 2, 1957 W. COOKSON 2,797,777
RELEASABLE FASTENING MEANS FOR RESILIENT SHEET MATERIAL PARTS
Original Filed Aug. 26, 1952 3 Sheets-Sheet 3
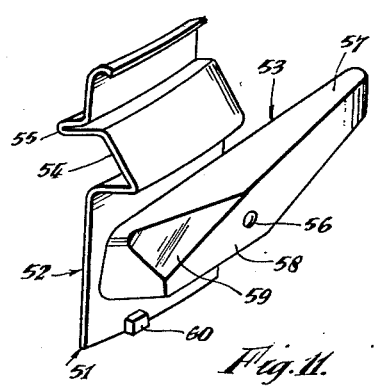
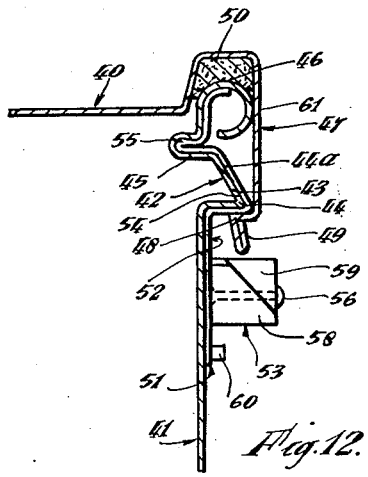
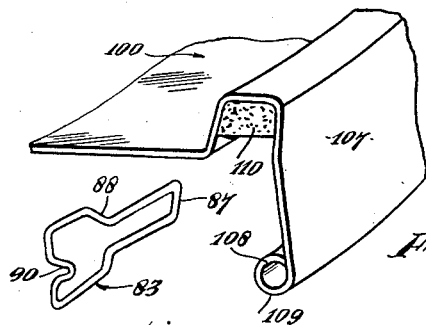
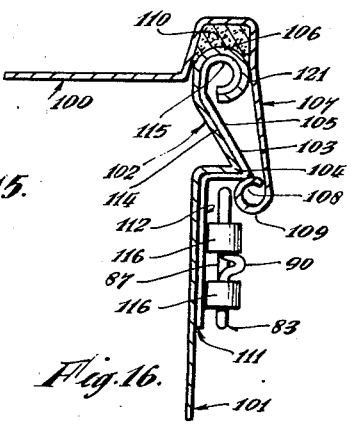
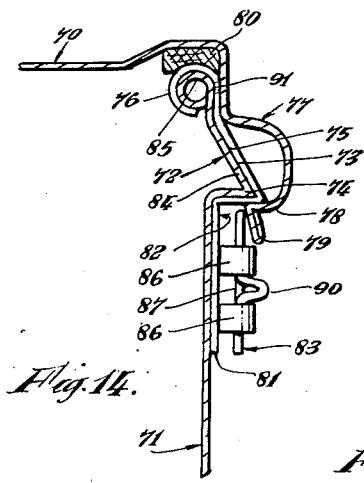
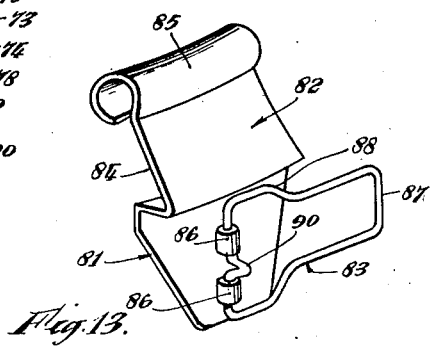

United States Patent Office 2,797,777
Patented July 2, 1957

2,797,777

RELEASABLE FASTENING MEANS FOR RESILIENT SHEET MATERIAL PARTS

William Cookson, Fareham, England, assignor of one-third to Julius Cato Vredenburg-Inglesby, London, England Continuation of application Serial No. 306,476, August 26, 1952. This application May 9, 1956, Serial No. 583,744

Claims priority, application Great Britain December 3, 1951

6 Claims. (Cl. 189—36)

This invention relates to releasable fastening means for sheet material co-operating parts, and aims to provide certain improvements therein.

The invention also relates to improvements in the type of joint between resilient sheet material parts broadly disclosed in my United States Letters Patent No. 2,522,097. This application is a continuation application of application Serial No. 306,476 filed August 26, 1952 and now abandoned.

An object of the present invention is to provide a releasable snap action lock joint, either straight or curved, which can be opened without relative axial sliding movement of the members, and applicable generally to the assembling and dismantling of sheet material structures such as cabinets, containers, roofing, air ducts, pipe covers and similar work.

It is another object of the present invention to provide a fastening device comprising a pair of resilient members and slider means for repeatedly coupling and uncoupling said pair of resilient members, said resilient members being constructed to prevent separation thereof when they are coupled and co-operating with said slider means as a result of their inherent resiliency to be readily and positively uncoupled upon sliding movement of said slider means.

In accordance with the present invention I provide a releasable fastening means for resilient sheet material parts comprising a male member, a female member, and a slider opening device, an edge portion of said male member including a channel defining a rim, said female member comprising a channel, the members being so dimensioned as to enable them to be forced into assembled relation, separation of the members being by said slider moved relatively to the members.

I also provide a slider having a part adapted to engage in the joint and a cam member pivoted to said slider which can be operated to effect a lever action on a member of the joint for opening purposes.

I also provide a joint between resilient sheet material parts comprising a male member and a female member, the male channelled member having two divergent walls joined by an apex which is curved, the second wall being free and having a free end in the form of a lip extending towards but spaced from the first wall; the female member having a channel consisting of two divergent walls joined by a broad curved apex, the first of said walls having a preferably stepped edge, the second wall being free and having its free edge bent back upon itself to provide a rigid abutment for co-operation with the camming element of a slider; the walls on the respective member being disposed in substantially nested relation with the rigid abutment of the female member and at least one wall of the male member in contact, and said members being so dimensioned as to enable them to be forced into assembled relation by a relative movement between the apex of the male member with respect to the space between the free bent edge of the second-mentioned wall and first-mentioned wall of the female member.

I may provide a slider having a camming element to slide between and open said members.

I also provide a releasable endless circular lock joint that can only be opened normally by moving a slider circumferentially round the members, applicable, for example, to securing the lid of a circular container.

The invention is illustrated by way of example merely in the accompanying drawings.

In the drawings:

Fig. 1 shows a broken perspective view of a form of lid secured to the top of a container by a circular lock joint, and a slider, Fig. 2 shows a cross-section view of the parts shown in Fig. 1, Fig. 3 shows a broken perspective view of the parts shown in Fig. 1, with the lid being released by the slider, Fig. 4 shows a perspective view of the preferred form of slider, Fig. 5 shows a perspective view of a handle or key for the slider, and, Fig. 6 shows a broken perspective view of the male and female members before assembly, Fig. 7 shows a cross-section view of the male and female members interlockingly engaged, Fig. 8 shows a perspective view of the preferred form of slider, Fig. 9 shows a perspective view of the joint being opened by the slider, Fig. 10 shows a cross-section view of the joint being opened by the slider, Fig. 11 is a perspective view of an opening device, Fig. 12 shows in cross sectional elevation a fragment of a container body and lid assembly together with the opening device shown in Fig. 11, Fig. 13 is a perspective view of an opening device, Fig. 14 shows cross-sectional elevation of a fragment of a container body and lid assembly together with the opening device shown in Fig. 13, Fig. 15 is a fragmentary perspective view of a container lid, Fig. 16 shows in cross-sectional elevation a fragment of a container body and lid assembly together with an opening device, the lid being that illustrated in Fig. 15, Fig. 17 is a perspective view of the lever or camming means adapted to be used with the opening devices illustrated in Figures 13 and 16.

In Figs. 1, 2 and 3, male member 7 is formed on the periphery of an open-mouthed sheet metal container, and female member 8 is formed on the periphery of a sheet metal lid for such container.

Male member 7 consists of a substantially U-shaped member or channel defined by two divergent walls 9 and 10 meeting in a bend 11, which is preferably curved. The free end of wall 9 is inwardly turned to form a lip or rim 12. Female member 8 is of substantially U-shaped or channel section, having two walls 13 and 14, and a crown portion 15, the free end of the wall 13 extending beyond the adjacent wall 9 of the male member. The free end of wall 13 has an inturned lip 16, as shown.

In Figs. 2 and 4, slider 17, which is made as a casting, is curved to suit the body of the container. It consists of a slide 18, which has an easy fit in male member 7, and a wall 19 on which is provided a bearing 20 for handle 21, as shown in Fig. 5.

The handle or key 21, which is preferably made from sheet metal, is curved to the contour of the container, and is provided with an upturned flange 22 having a shoulder or slanting end 23. Holes 24 are also provided.

In Figs. 1, 2 and 3 the handle and slider are shown as sembled, the handle pivoting on said slider by means of pin 25 (Fig. 2).

To operate the invntion the lid is forced progressively on to the container body by hand pressure round its circumference until lip 16 of the female member is fully snapped over and interlocked with lip or rim 12 of the male member, thus securing the lid on the container. In this position handle 21 lies against the container body, camming flange 22 on said handle being located behind lip 16 of the female member (Fig. 2). To release the lid, handle 21 is swivelled outwardly, as in Fig. 3, so causing flange 22 to press on lip 16 of the female member, thus forcing locally said member outwardly and upwardly from the male member. The slider is then moved round the circumference of the container, preferably in the clockwise direction, in the process flange 22 bearing against the edge of lip 16 of the female member and pushing it clear of the male member.

When interlocked the members form a tight joint. If required a gasket of rubber or similar material can be used between the members.

The lid can be repeatedly reassembled on the container without deterioration in the efficiency of the joint.

Although the example described shows a circular lock joint it is obvious that similar lock joint constructions can also be made in rectilinear or other forms.

In Fig. 7 the partly formed up pipe 6a, made of sheet metal, plastics, or similar material, has a channeled substantially U-shaped male member 7a and a channelled or substantially U-shaped female member 8a formed on its longitudinal edges. Male member 7a comprises a wall 9a, one end of which is bent in step form to provide a runway 10a for the slider. Wall 9a has an apex 11a curved in bulbous form, which is continued to a slanting wall 12a. The free end of wall 12a is inwardly bent to provide a lip or rim 13a. The female member 8a comprises a wall 14a reversedly bent to form wall 15a. Wall 14a is curved at 16a to continue with wall 6a of the pipe. Wall 15a is provided with a broad curved apex 17a, continued to a wall 18a, the free end of which has an inwardly reverse bent lip 19a, the wall 18a extending beyond the adjacent wall 12a of the male member.

For assembly of the joint, as in Fig. 7, male member 7a is pushed by hand pressure into female member 8a, in the process outer wall 18a of said female member opens, and wall 12a of said male member closes, sufficiently, without overstraining the members beyond their elastic limits, until lip or rim 13a of the male member snaps behind lip 19a of the female member. In this manner the respective lips are tightly interlocked, preventing any possibility of accidental separation, and holding both members in mutual tension.

I have found that providing the male member with an apex curved in bulbous form increases the springiness of said member, which allows the members to be pushed together more easily, and obtains a tighter joint than when the male member has a broad curved apex.

In Fig. 8, slider 20a, made of sheet metal, plastics, or suitable material, has a base wall 21a, and a wall 22a at a right angle to 21a, provided with a suitable handle 23a; an off-set piece or camming element 24a is also provided in wall 22a, as shown.

In Fig. 10, the slider is shown inserted in the male member, wall 22a fitting in runway 10a, the off-set piece 24a and wall 22a in the process forcing upwardly and outwardly lip 19a of the female member, so locally releasing said member off the male member. As the slider is slid down between the members of the joint, as in Fig. 10, the joint is progressively opened.

Referring to Figs. 11 and 12, there is provided a releasable fastening means between a first part or container lid 40, and a second part or container body 41, both parts 40, 41 being formed of resilient relatively stiff sheet material. The container body 41 has an edge portion 42 having divergent side walls including a channelled or substantially U-shaped male member 43 defining a rim 44 and a ramp 44a. The edge portion 42 having divergent side walls also includes a fold providing a groove 45, and further includes a bead 46 which defines the upper end portion of the edge portion 42. The extremity of the lid 40 adjacent the edge portion 42 is provided with a channelled female member 47 provided with an inturned lip 48 reverse bent into a flange 49. In its upper end portion the female member 47 is provided with a seal 50 downwardly seated upon the bead 46 of the edge portion 42. An opening device 51 comprises a slider 52 and a camming means having the form of a double-ended lever 53. The slider 52 comprises a female member 54 and a rib 55 both dimensioned to fit the male member 43 and the groove 45, respectively, of the edge portion 42 so as to provide a seating means for retaining the slider 52 on the edge portion 42 and permitting sliding movement of the opening device 51 along the edge portion 42. The lever 53 is pivoted on a pin 56 extending horizontally and transverse to the direction of sliding of the opening device 51. The lever 53 comprises a handle end 57 and a load end 58 provided with a camming part or oblique operating surface 59. Figs. 11 and 12 show the lever 53 in the inoperative position. A stop lug 60 is provided on the slider 52, and the lever 53 is regarded as being in the operative position when the handle end 57 is lowered into abutment with the stop lug 60. The lever 53 constitutes a camming means for disengaging the parts 40, 41 as will be described hereinafter.

In the assembled position of the lid, i. e. the position illustrated, the female member 47 co-operates with the rim 44 of the male member 43 to seat the female member 47 on the male member 43, the lip 48 of the female member 47 latching below the rim 44 all round the circumference of the container, although where extending adjacent the slider 52 the lip 48 is of course slightly separated from the rim 44 by the thickness of the slider material. Whilst the parts 40, 41 are thus engaged the seal 50 is in a state of compression to provide an effective closure of the container body 41. The female member 47 and the bead 46 are so dimensioned that they contact at 61 whereby the lid 40 is located laterally on the body 41.

The lid 40 is released by lowering the handle end 57 of the lever 53 until it abuts the stop 60 whereby the oblique surface 59 presses the flange 49 outwardly and upwardly and thus causes disengagement of the lip 48 from its latching position. This disengagement is in the first instance confined to the neighbourhood of the opening device 51, and complete disengagement is effected by sliding the opening device 51 along circumference of the edge portion 42, whereafter the lid 40 can be lifted off the container body 41.

The male and female members 43, 47 are so dimensioned that they may be forced into the assembled relationship by the lid 40 being pressed down onto the body 41, the resilience of at least the lid 40 allowing the lip 48 to be expanded over the ramp 44a and to snap into position below the rim 44.

Referring to Figs. 13, 14 and 17, there is provided a releasable fastening means between a first part or container lid 70 and a second part or container body 71, both parts 70, 71 being formed of resilient relatively stiff sheet material. The container body 71 has an edge portion 72 having divergent side walls and including a channelled male member 73 defining a rim 74 at the bottom of a ramp 75. The edge portion 72 also includes an inward bead 76 defining the upper end portion of the edge portion 72. The extremity of the lid 70 adjacent the edge portion 72 is provided with a channelled female member 77 provided with an inturned lip 78 reverse bent into a flange 79. In its upper end portion the female member 77 is provided with a seal 80 downwardly seated upon the bead 76 of the male member 73. An opening device 81 comprises a slider 82 and a camming means having the form of a single ended lever 83. The slider 82 comprises a female member 84 and a bead 85 both dimensioned to fit the male member 73 and the bead 76, respectively, of the edge portion 72 so as to provide a seating means for retaining the slider 82 on the edge portion 72 and permitting sliding movement of the opening device 81 along the edge portion 72. The lever 83, see Fig. 17, is made of wire and is pivoted to the slider 82 in bearings 86, the pivotal axis of the lever 53 extending vertically and transverse to the direction of the opening device 81. The lever 53 comprises a handle end 87 and a ramp part or work end 88. Figs. 13 and 14 show the lever 83 in the inoperative position. A stop lug 90 is formed on the wire from which the lever 83 is constructed, and the lever 83 is regarded as being in the operative position when it is pivoted through about 90° for the stop lug 90 to abut the slider 82. The lever 83 constitutes a camming means disengaging the parts 70, 71 as will be described hereinafter.

In the assembled position of the lid, i. e. the position illustrated, the female member 77 co-operates with the rim 74 of the male member 73 to seat the female member 77 on the male member 73, the lip 78 of the female member 77 latching below the rim 74 all round the circumference of the container (although where extending adjacent the slider 82 the lip 78 is of course slightly separated from the rim 74 by the thickness of the slider material). Whilst the parts 70, 71 are thus engaged the seal 80 is in a state of compression to provide an effective closure of the container body 71, the seal material being made sufficiently soft to recede over the bead 85 of the slider 82. The female member 77 and the edge portion 72 are so dimensioned that the lid 70 is located laterally on the body 71 as shown at 91.

The lid 70 is released by pivoting the handle 83 into the operative position whereby the ramp 88 presses the flange 79 outwardly and upwardly, and thus causes disengagement of the lip 78 from its latching position. This disengagement is in the first instance confined to the neighbourhood of the opening device 81, and complete disengagement is effected by sliding the opening device 81 along the circumference of the edge portion 72. Thereafter the lid 70 can be lifted off the container body 71.

The male and female members 73, 77 are so dimensioned that they may be forced into assembled relationship by the lid 70 being pressed down onto the body 71, the resilience of at least the lid 70 allowing the lip 48 to be expanded over the ramp 75 and snap into position below the rim 74.

Referring to Figs. 15, 16 and 17, there is provided a releasable fastening means between a first part or container lid 100 and a second part or container body 101, both parts 101, 102 being formed of resilient relatively stiff sheet material. The container body 101 has an edge portion 102 having divergent side walls and including a channelled or substantially U-shaped male member 103 defining a rim 104 and a ram part 105. The edge portion 102 having divergent side walls also includes an outward bead 106 which defines the upper end portion of the edge portion 102. The extremity of the lid 100 adjacent the edge portion 102 is provided with a channelled female member 107 provided with an inturned lip 108 formed by a bead 109. In its upper end portion the female member 107 is provided with a seal 110 downwardly seated upon the bead 106 of the edge portion 102. An opening device 111 comprises a slider 112 and camming means having the form of a single handed lever 83. The slider 112 comprises a female member 114 and a bead 115 both dimensioned to fit the male member 103 and the inside of the bead 106, respectiveley, of the edge portion 102 so as to provide a seating means for retaining the slider 112 on the edge portion 102 and permitting sliding movement of the opening device 111 along the edge portion 102. The lever 83, see Fig. 17, is made of wire and is arranged to pivot in bearings 116, the pivotal axis of the lever extending vertically and transverse to the direction of sliding of the opening device 111. The lever 83 comprises a handle end 87 and a ramp or work part 88. Fig. 16 shows the lever 83 in the inoperative position. A stop lug 90 is formed in the wire from which the lever 83 is constructed, and the lever 83 is regarded as being in the operative position when the handle end 87 is pivoted through about 90° for the stop lug 90 to abut the slider 112. The lever 83 constitutes a camming means for disengaging the parts 100, 101 as will be described hereinafter.

In the assembled position of the lid 100, i. e. the position illustrated, the female member 107 co-operates with the rim 104 of the male member 103 to seat the female member 107 on the male member 103, the lip 108 of the female member 107 latching below the rim 104 all round the circumference of the container, although where extending adjacent the slider 112 the lip 108 is of course slightly separated from the rim 104 by the thickness of the slider material. Whilst the parts 100, 101 are thus engaged the seal 110 is in a state of compression to provide an effective closure of the container body 101 the female member 107 and the bead 106 are so dimensioned that they contact at 121 whereby the lid 100 is located laterally on the body 101.

The lid 100 is released by pivoting the lever 83 into the operative position whereby the ramp part 88 presses the bead 109 outwardly and upwardly and thus causes disengagement of the lip 108 from its latching position. This disengagement in the first instance is confined to the neighborhood of the opening device 111, and complete disengagement is effected by sliding the opening device 111 along the circumference of the edge portion 102. Thereafter the lid 100 can be lifted off the container body 101.

The male and female members 103, 107 are so dimensioned that they may be forced into assembled relationship by the lid 100 being pressed down on to the body 101, the resilience of at least the lid 100 allowing the bead 109 to be expanded over the ramp 105 and to snap into position below the rim 104.

What I claim and desire to secure by Letters Patent is:

1. A releasable fastening means comprising a pair of parts with at least one of said parts being formed of resilient, relatively stiff sheet material, one of said parts having along an edge portion a male substantially U-shaped member having divergent side walls, the other of said parts having along an edge portion a substantially U-shaped female member having walls providing a channel for receiving the male member, one wall of the female member extending beyond the adjacent wall of the male member and having an inturned lip latching over the end of said adjacent wall on the male member when the members are in assembled relation, said members being so dimensioned to enable them to be forced into assembled relation by a movement in a direction substantially at a right angle to the edge portions, and an opening device having a part which is engageable with and slidable along the walls of the male member and having camming means comprising a shoulder for engaging the latching lip of the female member and imparting thereto at the point of engagement an angular movement, and adapted to progressively disengage the latching lip as the opening device is slid along the assembled members in one direction.

2. A releasable fastening means comprising a pair of parts with at least one of said parts being formed of resilient relatively stiff sheet material, one of said parts having along an edge portion a male member having divergent side walls, the other of said parts having along an edge portion a female member having walls providing a channel for receiving the male member, one wall of the female member extending beyond the adjacent wall of the male member and having an inturned lip latching over the end of said adjacent wall on the male member when the members are in assembled relation, said members being so dimensioned to enable them to be forced into assembled relation by a movement in a direction substantially at a right angle to the edge portions, and an opening device having a part which is engageable with and slidable along the walls of the male member and a camming part for engaging the latching lip on the female member, said camming part being pivotally mounted on the engageable part and adapted upon being pivoted outwardly of the engageable part, to disengage the latching lip by imparting thereto at the point of engagement, an angular movement and to progressively disengage the latching lip as the opening device is slid along the assembled members in one direction.

3. A releasable fastening means comprising a pair of parts with at least one of said parts being formed of resilient relatively stiff sheet material, one of said parts having an edge portion, said edge portion including a channelled male member defining a rim, the other of said parts having the extremity thereof provided with a channelled female member co-operating with said rim of said male member to thereby seat said female member on said male member, said female member being provided with an inturned lip latching below said rim of said male member when said members are assembled, said members being so dimensioned to enable them to be forced into assembled relation by a movement in a direction substantially at right angles to said edge portion, and an opening device provided with seating means for positioning said opening device on at least one of said parts and permitting sliding movement of said opening device therealong, said opening device further comprising camming means co-operating to impart to said inturned lip an angular movement to thereby progressively disengage said inturned lip from said rim as said opening device is slid.

4. A releasable fastening means comprising a pair of parts with at least one of said parts being formed of resilient relatively stiff sheet material, one of said parts having an edge portion, said edge portion including a channelled male member defining a rim, the other of said parts having the extremity thereof provided with a channeled female member co-operating with said rim of said male member to thereby seat said female member on said male member, said female member being provided with an inturned lip latching below said rim of said male member when said members are assembled, said members being so dimensioned to enable them to be forced into assembled relation by movement between said members whereby said female member is seated on said male member, and an opening device provided with seating means for positioning said opening device on said rim and permitting sliding movement of said opening device along said rim, said opening device further comprising camming means co-operating with said inturned lip to impart thereto an angular movement to thereby progressively disengage said inturned lip from said rim as said opening device is slid along said rim.

5. A releasable fastening means comprising a pair of parts with at least one of said parts being formed of resilient relatively stiff sheet material, one of said parts having along an edge portion a male member having divergent side walls, the other of said parts having along an edge portion a female member having walls providing a channel for receiving the male member, one wall of the female member extending beyond the adjacent wall of the male member and having an inturned lip latching over the end of said adjacent wall on the male member when the members are in assembled relation, said members being so dimensioned to enable them to be forced into assembled relation by a movement in a direction substantially at a right angle to the edge portions, and an opening device having a part which is insertable and slidable between the walls of one of said members and a camming part for engaging the latching lip on the female member, said opening device also having a lever pivotally mounted on the insertable part and having a handle end and a work end engaging one of said edge portions whereby upon pivotal movement of said lever outwardly of the insertable part the latching lip of the female member is imparted an angular movement so that the latching lip is progressively disengaged as said opening device is slid along the assembled members.

6. A releasable fastening means comprising a pair of parts with at least one of said parts being formed of resilient relatively stiff sheet material, one of said parts having along an edge portion a male substantially U-shaped member having divergent side walls, the other of said parts having along an edge portion a substantially U-shaped female member having walls providing a channel for receiving the male member, one wall of the female member extending beyond the adjacent wall of the male member and having an inturned lip latching over the end of said adjacent wall on the male member when the members are in assembled relation, said members being so dimensioned to enable them to be forced into assembled relation by a movement in a direction substantially at a right angle to the edge portions, and an opening device having a part which is insertable between and slidable along the walls of one of said members and having camming means comprising a shoulder for engaging the latching lip of the female member and a lever having a handle end and a work end engaging one of said edge portions to thereby displace said shoulder and impart to the latching lip of the female member an angular movement whereby as said opening device is slid along the assembled members the latching lip is progressively disengaged.

No references cited.